Nov. 2, 1926.
T. W. CASE
1,605,526
TRANSPARENT COVERING FOR SLOTS
Filed Feb. 12, 1925
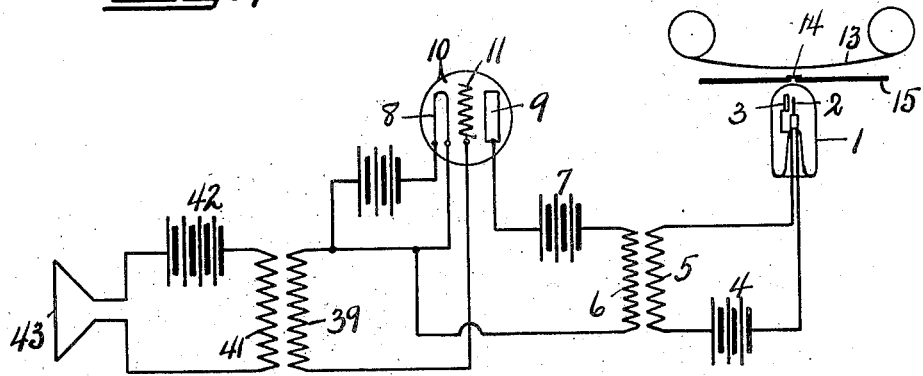
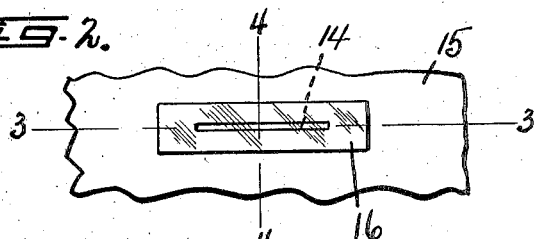
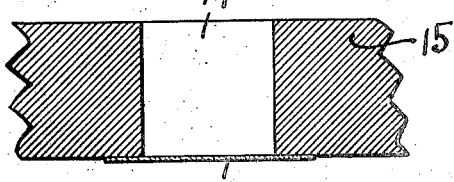
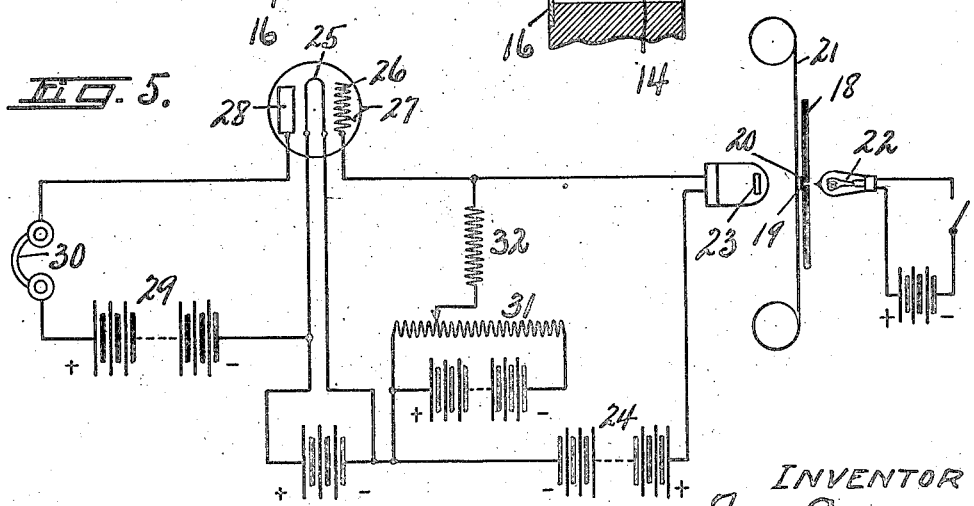
WITNESS
INVENTOR
T.W. Case
BY
ATTORNEYS Patented Nov. 2, 1926.

1,605,526

UNITED STATES PATENT OFFICE.

THEODORE WILLARD CASE, OF AUBURN, NEW YORK, ASSIGNOR TO CASE RESEARCH LABORATORY INCORPORATED, OF AUBURN, NEW YORK, A CORPORATION OF NEW YORK.

TRANSPARENT COVERING FOR SLOTS.

Application filed February 12, 1925. Serial No. 8,827.

This invention relates to certain new and improved apparatus for taking, printing, or reproducing a film record and is particularly designed for use in producing a film record of light variations as caused by electrical variations preferably corresponding to sound-wave variations, as for instance, articulate sound waves.

In apparatus of this character for producing or reproducing a film record of light variations, it has been customary to move the film past a small printing slot in a wall disposed between the film and a source of light, and it is essential that the film move past in tight contact with the wall so that only the portion of the film directly in front of the slot is exposed to the light emanating from the source.

Considerable difficulty has been experienced in producing an accurate, clear, and exact film record, and also in reproducing accurately the original sound from a record due to the fact that dust, film material, or foreign matter collects in the slot—more particularly is scraped off the film record as it passes by the edge of the slot, and this foreign material partially obstructs the slot which is extremely small, as for illustration, .0015 of an inch in width and .1 of an inch in length. And the result is that the film record produced is somewhat unsatisfactory because of this obstruction of the slot, and for the same reason a reproduction of even a perfect film record is unsatisfactory, and the object of this invention is the production of an apparatus retaining all the advantages of present similar apparatus but in which this disadvantage is avoided.

Other objects and advantages relate to the details of the structure for effecting the main object of this invention, all as will more fully appear from the following description, taken in connection with the accompanying drawings, in which:

Figure 1 is a diagrammatic illustration of an apparatus for producing a film record of light variations as produced by electrical variations corresponding to articulate sound waves, or musical tones.

Figure 2 is a front elevation of the printing slot.

Figure 3 is a section on line 3—3, Figure 2.

Figure 4 is a section on line 4—4, Figure 2.

Figure 5 is a diagrammatic illustration of an apparatus for reproducing sound waves from a film record.

Figure 6 is a view similar to Figure 4 of a slightly modified form.

In a general way, the structure of Figure 1 is the same as that disclosed in my application Serial No. 719,098, filed June 10, 1924, and comprises a variable source of cathode rays including two spaced electrodes —2— and —3— enclosed in a bulb —1—, the electrodes being connected in circuit with a source of potential as a battery —4— and a secondary —5— of a transformer, the primary —6— of which is connected in circuit with a source of potential —7— across the filament —8— and plate —9— of a space discharge device —10—, the grid —11— of which is connected in circuit with the filament —8— and the secondary —39— of a transformer, the primary —41— of which is connected in circuit with a source of potential as a battery —42— and a microphone —43—.

In a general way this structure includes means for varying an electric current in accordance with sound-wave variations and for amplifying such variations, and thereby producing amplified variations in the lamp —1—, the rays emanating from which are adapted to be printed or photographed upon a film —13— moving past the narrow slot —14— in the wall —15—. The wall —15— may be a portion of an enclosure for the film, or a portion of an enclosure for the lamp, and constitutes that portion of the structure in which the usual slot is formed, it being essential that the film move past the slot —14— in substantially tight relation with the wall —15—. In order to retain the advantages of the present apparatus and still eliminate the possibility of the slot —14— becoming obstructed by dust or other matter, particularly at the edge adjacent the film, I provide a very thin sheet or strip of transparent material, such as mica or glass, of greater area than the cross-sectional area of the slot, and this sheet —16— as perhaps best illustrated in Figures 2, 3 and 4, is secured to the wall —15— on the side past which the film moves in tight relation, and so as to cover the slot —14—. The sheet —16— should be very thin so as not to space the film any substantial distance from the wall —15— and I have found that a sheet of mica or glass approximately .0005 inches in thickness is satisfactory for this purpose.

This sheet of transparent material may be secured to the wall —15— in any suitable manner as by cement, glue, paste, etc. so long as it covers the slot so as to prevent a scraping action of the edge of the slot upon the moving film whereby the passage of light rays through the slot is substantially unimpaired, due to the transparent nature of the sheet —16—.

In Figure 6 the thin sheet —16— of transparent material is illustrated as inset in a similarly shaped recess surrounding the slot —14—. This construction may be desirable but is not essential due to the extreme thinness of the sheet of transparent material that should be used, as from .0005 of an inch to .005 of an inch in thickness.

In Figure 5, the wall —18— is constructed in the same manner as the wall —15— and the slot —19— in like manner as the slot —14— is covered by a sheet or strip —20— of transparent material such as mica or glass positioned upon the same side of the wall —18— as the film —21—. In this reproducing arrangement the light from a suitable source, such as lamp —22— passes through the slot —19— and the registering portion of the transparent strip —20—, and then passes through the film —21—which constitutes the sound record and strikes the light sensitive cell —23—, which may be formed of any suitable material that varies its resistance in accordance with the intensity of the light to which it is subjected, as for instance, selenium.

The light cell —23— may, as shown, be connected in circuit with a suitable source of potential as battery —24— across the filament —25— and grid —26— of a spaced discharge device —27—, the filament —25— and plate —28— of which device are connected in circuit with a source of potential as battery —29— and a translating device as the telephone receivers —30—.

For the purpose of compensating for variations in light cells as manufactured, or other varying conditions, a potentiometer —31— and a fixed resistance —32— may be placed across the filament and grid of the electron discharge device —27—.

It will be obvious from the above description that the slot through which the light passes to the film is in each case covered by a very thin transparent sheet properly secured in place and positioned at the end of the slot adjacent the film, whereby this portion of the slot is protected against the entrance of foreign matter, and the film does not scrape across the edges of the slot in its normal movement.

As above suggested, the slot —16— is very small and perhaps preferably is about .0015 of an inch in width and .1 of an inch in length and the transparent sheet may be of any desired size so that it is sufficiently large to cover the slot and the strip is of such extreme thinness, as for instance, .0005 inches, as not to space the film any substantial distance from the slot.

Altho I have shown and described specific structures as illustrative of embodiments of my invention, I do not desire to restrict myself to the details of the structures disclosed, as various changes may be made in the particular materials and the size, form and relation of the same without departing from this invention, as set forth in the appended claims.

I claim:

1. An apparatus for producing sound pictures on or reproducing sound pictures from a film comprising a wall having a narrow elongated slot therein, and an extremely thin transparent sheet extending across the slot on the side past which the film is adapted to move, and with which sheet the film is adapted to contact in its movement, and an adhesive rigidly securing the sheet to the wall.

2. An apparatus for producing sound pictures on or reproducing sound pictures from a film comprising a wall having a narrow elongated slot therein and a transparent sheet of a thickness not greater than .005 of an inch extending across the slot on the side past which the film is adapted to move and with which sheet the film is adapted to contact in its movement, and an adhesive rigidly securing the sheet to the wall.

3. An apparatus for producing sound pictures on or reproducing sound pictures from a film comprising a wall having a slot approximately .001 of an inch in width and .1 of an inch in length and a transparent sheet of a thickness not substantially greater than .0005 of an inch extending across the slot on the side past which the film is adapted to move and with which sheet the film is adapted to contact in its movement, and an adhesive rigidly securing the sheet to the wall.

In witness whereof I have hereunto set my hand this 6 day of February, 1925.

THEODORE WILLARD CASE.